United States Patent
Calis

(10) Patent No.: US 6,558,591 B2
(45) Date of Patent: May 6, 2003

(54) PROCESS OF MAKING MICROPOROUS FILM

(75) Inventor: Gijsbertus H. M. Calis, Hulsberg (NL)

(73) Assignee: DSM N.V., Heerlen (NL)

( * ) Notice: Subject to any disclaimer, the term of this patent is extended or adjusted under 35 U.S.C. 154(b) by 219 days.

(21) Appl. No.: 09/729,209

(22) Filed: Dec. 5, 2000

(65) Prior Publication Data

US 2001/0038947 A1 Nov. 8, 2001

Related U.S. Application Data

(63) Continuation of application No. PCT/NL99/00344, filed on Jun. 3, 1999.

(30) Foreign Application Priority Data

Jun. 5, 1998 (NL) .............................. 1009319

(51) Int. Cl.[7] .................. B29C 47/78; B29C 55/04; B29C 55/12; C08J 5/18; C08J 9/28
(52) U.S. Cl. ................. 264/41; 264/210.4; 264/211.19; 264/280; 264/288.8; 264/289.3; 264/289.6; 264/290.2; 264/344
(58) Field of Search ................ 264/41, 210.4, 264/211.19, 280, 288.8, 289.3, 289.6, 290.2, 344

(56) References Cited

U.S. PATENT DOCUMENTS 4,833,172 A * 5/1989 Schwarz et al. .......... 264/41 X
4,873,034 A * 10/1989 Kono et al .................... 264/41

FOREIGN PATENT DOCUMENTS

| | | |
|---|---|---|
| EP | 0683196 A1 | 11/1995 |
| JP | 06325747 A | 11/1994 |
| JP | 07268118 A | 10/1995 |
| JP | 08034873 A | 2/1996 |
| JP | 10067871 A | 3/1998 |

* cited by examiner

Primary Examiner—Leo B. Tentoni
(74) Attorney, Agent, or Firm—Pillsbury Winthrop LLP

(57) ABSTRACT

A microporous film of polyethylene having an intrinsic viscosity above 5 dl/g is prepared from a homogeneous solution in an evaporable solvent. The film is cooled and evaporable solvent is evaporated at a temperature below the dissolution temperature. The film is stretched to produce the micorporous film and is passed through a calender. The microporous films with a porosity of up to about 70% by volume and a battery separator quality factor (F) of at least 2.5 are described. Battery separators formed from the microporous films are also described.

6 Claims, No Drawings

PROCESS OF MAKING MICROPOROUS FILM

This is a International Appln. No. PCT/NL99/00344 filed Jun. 3, 1999.

The invention relates to a microporous film that contains at least polyethylene having an intrinsic viscosity of more than 5 dl/g (measured at 135° C. in decalin) and a porosity of at most 70 vol. %. In particular the invention relates to a microporous film that is suitable for use as a battery separator.

Such a microporous film is known from JP-A-08034873. In Experiment 27, JP-A-08034873 describes a microporous film that contains polyethylene having an intrinsic viscosity of 14 dl/g and a porosity of 52.5 vol. %. A film suitable for use as a battery separator is preferably as thin as possible. For this reason the porosity is at most 70 vol. %. The film's weight per unit area and per unit thickness is preferably as large as possible and the film preferably has the highest possible puncture resistance, to prevent damage by sharp parts of the electrodes during the winding of the film. A film suitable for use as a battery separator also has the highest possible conductance. As the conductance depends on the number of open pores, the air permeability, expressed in the Gurley value, is a measure of conductance. The Gurley value is determined in s/50 ml according to ASTM standard D 726, using a measuring area of 6.45 cm$^2$ (1 square inch) and a weight of 567 grams. A low Gurley value means that the film has a high air permeability and hence also high conductance.

The aim of the invention is to provide a microporous film, which, in the combination of properties mentioned above, is more suitable for use as a battery separator than the known films.

This aim is achieved in that the film has a battery separator's quality factor (F) that is at least 2.5 and $$F=BW\cdot PR/(G\cdot t),$$

where BW is the basic weight (g/m$^2$), PR the puncture resistance in g, G the Gurley in sec/50 ml and t the film's thickness in $\mu$m.

This makes the combination of desired properties for a film intended for use as a battery separator superior to that of the known films.

'Intrinsic viscosity' is in this text understood to be the intrinsic viscosity measured according to ASTM D 4020, in decaline at 135° C. (dl/g).

'Puncture resistance' is in this text understood to be the puncture resistance measured according to DIN 53373(g).

The 'Gurley' is in this text understood to be the Gurley measured according to ASTM D 726 (sec/50 ml). The film's thickness (t) is the thickness measured according to ISO 4593 ($\mu$m).

The invention also relates to a process for preparing a microporous film according to the invention. A known process for preparing a microporous film is described in JP-B-8-34873. This describes a process for preparing a microporous polyethylene film by forming a homogeneous polyethylene solution having an intrinsic viscosity of more than 5 dl/g into a film, cooling the film and biaxially stretching the cooled film.

A drawback of this process is that the known process described in JP-A-08034873 cannot be used to produce films having a battery separating quality factor of 2.5 of more.

The aim of the invention is to provide a process by which a microporous film with a battery separating quality factor of at least 2.5 can be produced.

This aim is achieved by removing the solvent, which is an evaporable solvent, from the film before the stretching by means of evaporation at a temperature below the dissolution temperature of the polyethylene in the solvent, and passing the stretched film through a calender.

The known polyethylene solvents are used as the evaporable solvents, for example aliphatic, cycloaliphatic and aromatic hydrocarbons, such as toluene, xylene, tetraline, decaline, $C_6$–$C_{12}$ alkanes or petroleum fractions, but also halogenated hydrocarbons, for example trichlorobenzene and other known solvents. In connection with the removal of the solvent use is preferably made of solvents whose boiling point at atmospheric pressure is lower than 210° C., which is the case with almost all the solvents mentioned above.

To produce a film from a solution of polyethylene, use must be made of a homogeneous polyethylene solution having an intrinsic viscosity of more than 5 dl/g. The continuous preparation of a homogeneous polyethylene solution can be effected using the known techniques, for example in an extruder. The use of this technique presents the advantage that the solution can be prepared and extruded into a film in a single continuous operation, or can be processed into a film in another manner. The invention is however not limited to such a technique, and it will immediately be clear to one skilled in the art that homogeneous solutions prepared in a different manner can also be processed into a microporous film.

The concentration of the polyethylene in the solution may vary within a wide range and will generally be chosen to be between 2 and 50 wt. %, primarily for practical reasons. Solutions containing less than approximately 2 wt. % polyethylene yield such fragile films that the further processing thereof becomes extremely difficult. On the other hand, the solutions become increasingly difficult to process at concentrations above 30 wt. %, or in particular above 50 wt. %. Concentrated solutions having polyethylene concentrations of 50 wt. % or more are therefore not preferable, although the use of such solutions is possible, and is hence covered by the present invention. When a portion of the polyethylene has been cross-linked before it is dissolved, the solution's processability in some cases proves to be better than when the solution contains only non-cross-linked polyethylene in the same total concentration.

A film is formed from the polyethylene solution. This can be done in various ways, for example by means of spinning via a spinneret having a very wide slot-shaped nozzle, by means of extrusion or through pouring onto a roll or band.

After a polyethylene solution has been processed into a film the film consisting of the solution is cooled. This can be effected by passing the film through a cooling bath containing a cooling agent. Preferably use is made of a cooling agent in which the polyethylene will not dissolve. A very suitable cooling agent is water. The temperature is then lowered so that gelling occurs in the film, resulting in a structure that is sufficiently strong and stable for further processing. It is possible to cool to ambient temperature or even lower, but as the solvent must be evaporated from the film in the next process step, it will be clear that it is highly desirable to generally keep the temperature as high as possible to obtain a profitable process. This will limit the supply of heat, required to remove solvent from the film through evaporation, as much as possible.

Next, the solvent is evaporated from the film at a temperature below the dissolution temperature. The dissolution temperature is the temperature above which the polyethylene concerned can be homogeneously dissolved in the solvent. When that solution is cooled to below the dissolution temperature, gelling will occur. There may be a limited spread between the dissolution temperature and the gelling temperature. In that case the solvent is in the process according to the present invention evaporated from the film at a temperature below the lower of those temperatures.

If the forming technique employed allows, the film can optionally be prestretched, which means that the linear rate at which the gelled film is taken or transported from the bath differs from the linear rate at which the film is formed from the solution. When use is made of for example extrusion, the latter rate is the linear rate at which the solution flows from the extrusion slot die. The prestretching is in this context defined as the quotient of the transport or take-up rate described above and the aforementioned outflow rate.

The film tends to shrink during the evaporation of the solvent after the film has been formed. To obtain a microporous film, this shrinkage can be prevented in at least one direction lying in the plane of the film. The film can to this end be clamped in a simple manner. If the film is clamped in two directions, the thickness is the only dimension that can decrease and that will indeed actually decrease. Something similar holds for for example tubular films and hollow filaments. Not only can shrinkage be prevented, but it is even possible to effect stretching in one or two directions already during the evaporation of the solvent.

After the solvent has evaporated from the film, the film is subjected to a stretching operation in one or more directions. This stretching of the film from which solvent has been cleared can optionally take place at a higher temperature than that at which the stretching during the removal of the solvent through evaporation took place, providing this higher temperature does not lie so far above the polyethylene's melting temperature as to cause melt fracture.

The pressure on the calender may be between 10 and 150 kg/cm. At a pressure lower than 10 kg/cm the battery separator quality factor may sometimes be smaller than 2.5. At a pressure of more than 150 N/mm the Gurley will increase undesirably.

Preferably the pressure on the calender is between 25 and 50 kg/cm. This will ensure that the battery separator quality factor is greater than 3.

It is also possible to exert a tensile force of between 2 and 3 $N/cm^2$ on the film via a takeoff roll.

The invention also relates to the use of the film according to the invention as a battery separator.

The invention also relates to a battery containing the film according to the invention.

What is claimed is:

1. Process for the preparation of a microporous film of polyethylene having an intrinsic viscosity of more than 5 dl/g, measured at 135° C. in decalin, comprising, forming a film from a homogeneous solution of polyethylene in an evaporable solvent;

cooling the film under conditions resulting in gel formation;

evaporating the evaporable solvent at a temperature below the dissolution temperature;

stretching the film in one or more directions to produce a microporous film of polyethylene; and, passing the microporous film through a calendar.

2. Process according to claim 1, wherein the microporous film is passed through the calendar at a pressure of between 25 and 50 kg/cm.

3. Process according to claim 2, wherein the step of forming a film comprises forming said homogeneous mixture of polyethylene in an extruder and extruding the homogenous solution into a film.

4. Process according to claim 2, wherein the homogeneous solution comprises from 2 to 50 wt % polyethylene.

5. Process according to claim 2, wherein the homogeneous solution comprises from 2 to 30 wt % polyethylene.

6. Process according to claim 2, wherein the step of cooling comprises passing the film through a bath of cooling agent comprising water.

* * * * *